United States Patent Office 3,708,447
Patented Jan. 2, 1973

---

3,708,447
GRAFT COPOLYMERS CONTAINING N-3-OXO-HYDROCARBON-SUBSTITUTED ACRYLAMIDE UNITS
Donald Irvin Hoke, Chagrin Falls, Ohio, assignor to The Lubrizol Corporation, Wickliffe, Ohio
No Drawing. Filed Mar. 22, 1971, Ser. No. 127,012
Int. Cl. D06m *15/38;* C08f *25/00, 43/08*
U.S. Cl. 260—17.4 GC  3 Claims

ABSTRACT OF THE DISCLOSURE

Graft copolymers are formed by reacting a naturally occurring polyhydroxy base polymer, such as cellulose, with an N-3-oxohydrocarbon-substituted acrylamide such as diacetone acrylamide in the presence of a free radical catalyst, preferably a salt of periodic acid or a ceric salt. The grafting operation modifies the properties of the base polymer.

---

This invention relates to new polymeric compositions of matter and methods for their preparation. More particularly, it relates to graft copolymers wherein the base polymer is a naturally occurring polymer containing a plurality of primary or secondary hydroxy groups and the side chains grafted on said base polymer comprise repeating units of the formula $$-CH_2-\underset{\underset{\underset{\underset{\underset{\underset{\underset{R^1}{C=O}}{R^2-C-R^3}}{R^4-C-R^5}}{H-N}}{C=O}}{R^6}}{|}$$

wherein each of $R^1$, $R^4$ and $R^5$ is hydrogen or an aliphatic or cycloaliphatic hydrocarbon or substituted hydrocarbon radical; each of $R^2$ and $R^3$ is hydrogen or a hydrocarbon or substituted hydrocarbon radical; and $R^6$ is hydrogen or a lower alkyl radical.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Tolyl |
| Ethyl | Xylyl |
| Propyl | Benzyl |
| Butyl | Cyclohexyl |
| Hexyl | Cyclopentyl |
| Octyl | Methylcyclopentyl |
| Decyl | Cyclopentadienyl |
| Vinyl | Vinylphenyl |
| Allyl | Isopropenylphenyl |
| Ethynyl | Cinnamyl |
| Propargyl | Naphthyl |
| Phenyl | |

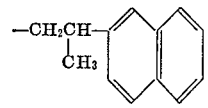
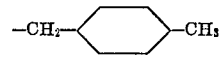
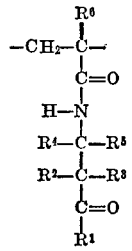

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Hydroxy
Ether (especially lower alkoxy)
Keto
Ester (especially lower carbalkoxy)
Aminoacyl (amide)
Nitro
Cyano
Mercapto
Thioether
Sulfoxy
Sulfone In general, no more than about three such substituent groups will be present for each 10 carbon atoms in the radical.

Preferably, the hydrocarbon or substituted hydrocarbon radicals in the compounds of this invention are free from ethylenic and acetylenic unsaturation and have no more than about 30 carbon atoms, desirably no more than about 12 carbon atoms. A particular preference is expressed for lower hydrocarbon radicals, the word "lower" denoting radicals containing up to seven carbon atoms. Still more preferably, they are lower alkyl or aryl radicals, most often alkyl.

As previously indicated, $R_1$, $R_4$ and $R_5$ are hydrogen or aliphatic or cycloaliphatic radicals; they are preferably lower alkyl. $R^2$ and $R^3$ may be hydrogen (preferably) or any hydrocarbon or substituted hydrocarbon radical. $R^6$ is usually hydrogen or methyl, especially hydrogen.

The base polymer from which the graft copolymers of this invention are derived may be any naturally occurring polymer containing a plurality of primary or secondary hydroxy groups. Polysaccharides are preferred; these include starch, cellulose, hemicellulose, dextrin, pectins and alginates. Chemical modifications of said naturally occurring polymers, such as cellulose acetate and nitrocellulose, are also suitable and are included in the term "naturally occurring polymer" for the purposes of this invention. It is essential, however, that the base polymer contain a plurality of free hydroxy groups and that at least part of said hydroxy groups be primary or secondary. This is necessary in order that there be hydrogen atoms in the polymeric molecule which can be abstracted by a free radical catalyst to form sites for grafting.

Suitable N-3-oxohydrocarbon-substituted acrylamides are disclosed and claimed in U.S. Pat. 3,277,056. The preferred compounds are N-(1,1-dimethyl-3-oxobutyl) acrylamide, hereinafter referred to as diacetone acrylamide, and N-(1,1-dimethyl-3-oxobutyl)methacrylamide, hereinafter referred to as diacetone methacrylamide. Diacetone acrylamide is most readily available and therefore reference will be made to this compound hereinafter. However, it should be understood that other N-3-oxohydrocarbon-substituted acrylamides can be substituted therefor.

The graft copolymers of this invention may be prepared by reaction of the base polymer with the diacetone acrylamide or a similar substituted acrylamide of the formula

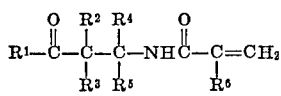

wherein $R^{1-6}$ are as previously defined, in the presence of a free radical catalyst. Suitable catalysts include benzoyl peroxide, acetyl peroxide, azobisisobutyronitrile, sodium periodate and ceric salts. The latter two of these have been found particularly useful, with sodium metaperiodate being preferred.

The grafting reaction is carried out at a temperature between about room temperature and 100° C., by merely contacting the mixture of base polymer and diacetone acrylamide with the catalyst. It is usually convenient to carry out the reaction in the presence of a suitable diluent which is a solevent for diacetone acrylamide; water is generally preferred. The relative proportions of diacetone acrylamide to base polymer are not critical; in general, the higher the proportion of diacetone acrylamide the greater the amount of grafting.

In many instances, substantial homopolymerization of diacetone acrylamide occurs in addition to the formation of the desired graft copolymer. When this happens, the homopolymer may be extracted with a suitable solvent leaving the graft copolymer behind.

The preparation of the graft copolymers of this invention is illustrated by the following examples. All parts and percentages are by weight.

EXAMPLE 1

A mixture of 470 parts of water, 29.2 parts of diacetone acrylamide and 4.16 parts of cotton cellulose is flushed with nitrogen and heated to 52° C. Sodium metaperiodate, 0.247 gram, is added and the mixture is stirred under nitrogen for 1¼ hours at 55–58° C. After 50 minutes, the reaction mixture becomes cloudy and at the end of the reaction period it is opaque and contains small visible particles.

The solvent is decanted from the precipitated polymer and the latter is washed with water and dried in a vacuum oven at 90° C. The dried polymer is extracted for 7 days with chlorobenzene in a Soxhlet extractor and the extracted material is recovered by evaporation of the solvent. The extracted material is dried again in a vacuum oven. There is obtained 10.1 parts of the desired graft copolymer of cellulose and diacetone acrylamide. This represents a 142% weight increase by grafting.

EXAMPLE 2

Cotton cellulose, 2.214 parts, is immersed in a solution of 17.81 parts of ceric ammonium nitrate in 800 parts of water for 12 minutes. The excess water is pressed out several times between sheets of filter paper, after which the damp cellulose is stirred for 20 hours at room temperature with a mixture of 8.17 parts of diacetone acrylmide and 193 parts of cyclohexane. Following the reaction, the cyclohexene is decanted and the solid residue is washed with two 400-part portions of benzene and two 400-part portions of water. The solvent is again pressed out between sheets of filter paper and the residue is dried in a vacuum oven and extracted for ten days with chlorobenzene. After a second drying, there is obtained 2.802 parts of the desired graft copolymer of cellulose and diacetone acrylamide.

EXAMPLE 3

Following the procedure of Example 1, 29 parts of diacetone acrylamide is reacted with 4 parts of potato starch. A similar graft copolymer is obtained.

EXAMPLE 4

Following the procedure of Example 1, a graft copolymer is obtained by the reaction of 29 parts of diacetone acrylamide with 4 parts of hemicellulose.

EXAMPLE 5

Following the procedure of Example 1, a graft copolymer is obtained by reaction of 29 parts of diacetone acrylamide with 5 parts of cellulose triacetate.

EXAMPLE 6

Following the procedure of Example 2, a graft copolymer is obtained from 10 grams of diacetone methacrylamide and 2.5 grams of nitrocellulose.

The graft copolymers of this invention are generally useful in the same ways in which the base polymers are used. The grafted side chains frequently impart additional desirable characteristics to the polymer, but they do not destroy the properties which make the polymers useful in their various fields. For example, graft copolymers derived from cellulose frequently have improved "permanent press" properties as compared with untreated cellulose. Cellulose-derived polymers are also useful for the formation of fabrics, paper and the like; nitrocellulose-derived polymers are useful for the formation of protective films.

Graft copolymers of cellulose; acetate and diacetone acrylamide may be formed into membranes which are useful for desalination of water by reverse osmosis, or hyperfiltration. This application of cellulose acetate membranes is known in the art, and the similar use of diacetone acrylamide polymers is disclosed and claimed in U.S. Pat. 3,520,804.

What is claimed is:

1. A graft copolymer wherein the base polymer is a polysaccharide and the side chains grafted on said base polymer comprise repeating units of the formula

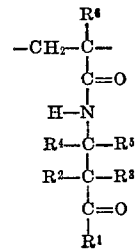

wherein each of $R^1$, $R^4$ and $R^5$ is hydrogen or an aliphatic or cyclo aliphatic hydrocarbon or substituted hydrocarbon radical; each of $R^2$ and $R^3$ is hydrogen or a hydrocarbon or substituted hydrocarbon radical; and $R^6$ is hydrogen or a lower alkyl radical; the substituents on said substituted hydrocarbon radicals being halide, hydroxy, ether, keto, ester, aminoacyl, nitro, cyano, mercapto, thioether, sulfoxy or sulfone groups.

2. A composition according to claim 1 wherein the repeating units in said side chains are derived from diacetone acrylamide.

3. A composition according to claim 2 wherein the base polymer is cellulose.

References Cited
UNITED STATES PATENTS

| | | | |
|---|---|---|---|
| 3,125,405 | 3/1964 | Gardon | 260—17.4 |
| 3,425,942 | 2/1969 | Coleman | 252—51.5 |
| 3,578,637 | 5/1971 | Coleman | 260—17.4 GC |
| 3,520,804 | 7/1970 | Hoke | 210—23 |
| 3,518,326 | 6/1970 | Forsberg | 161—232 |
| 3,044,972 | 7/1962 | Segro et al. | 260—17.4 GC |

WILLIAM H. SHORT, Primary Examiner

E. WOODBERRY, Assistant Examiner

U.S. Cl. X.R.

8—116.3; 162—157 C, 168; 210—23; 260—17 A, 17.4 CL